United States Patent Office 3,822,150
Patented July 2, 1974

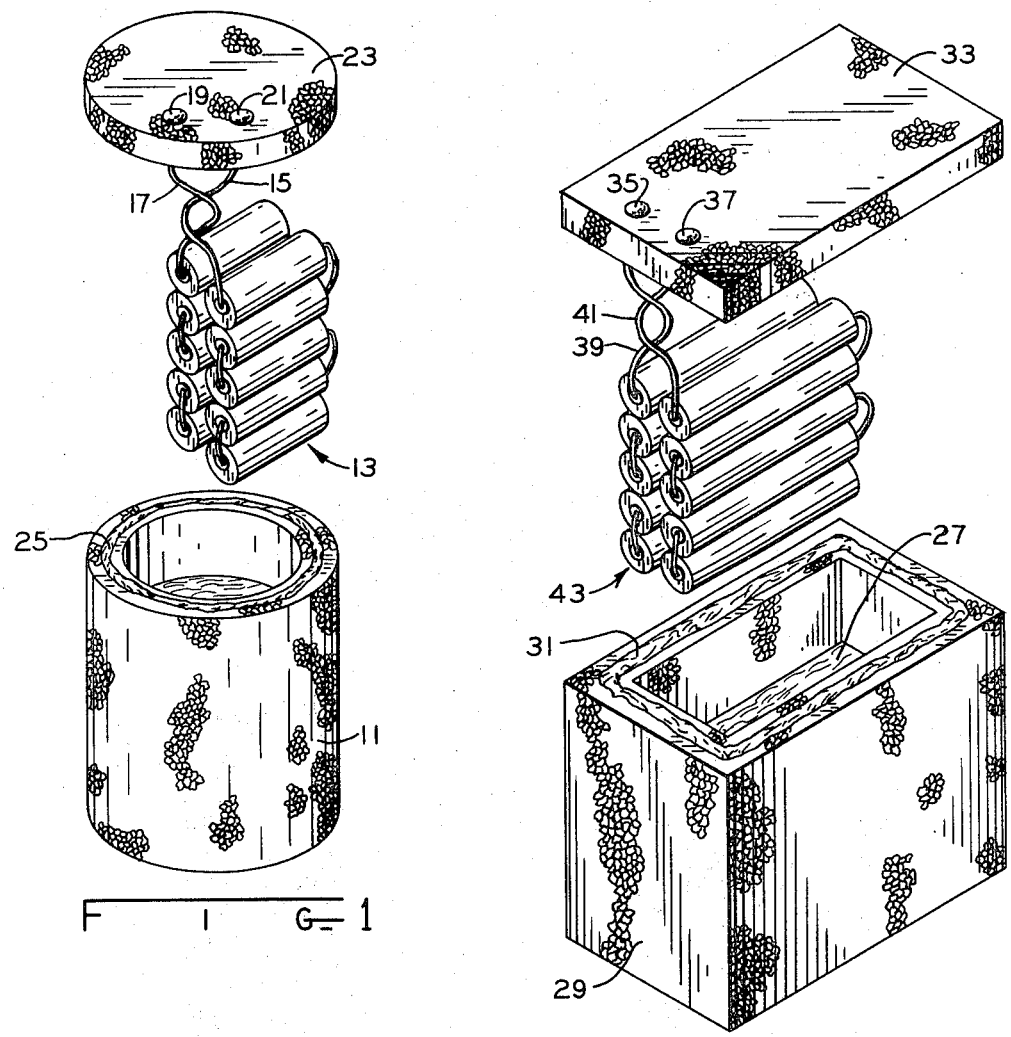
FIG. 1
FIG. 2
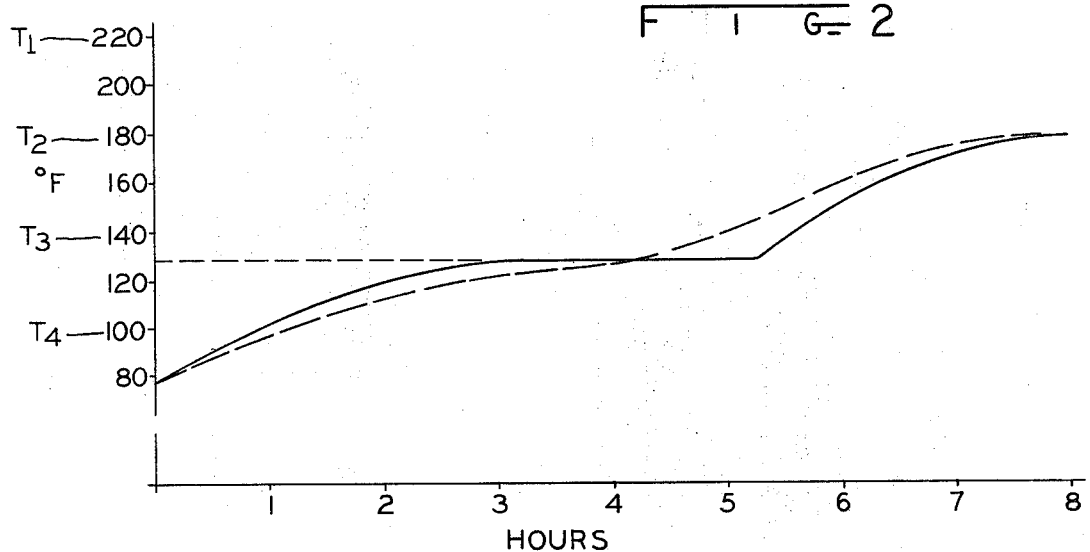
FIG. 3

3,822,150
HIGH TEMPERATURE BATTERY PACKAGE AND A METHOD OF ASSEMBLING SAME
Don Harvey Beardshear, Altamonte Springs, Fla., and Ronald Henry Limbach, Fort Wayne, Ind., assignors to The Magnavox Company, Fort Wayne, Ind.
Filed May 15, 1972, Ser. No. 253,093
Int. Cl. H01m 45/02
U.S. Cl. 136—161                                   12 Claims

ABSTRACT OF THE DISCLOSURE

A battery package to be disposed in an elevated temperature environment for a predetermined length of time as the primary energy source for a telethermometer transmitter is disclosed comprising a liquid-tight molded foam heat insulating housing having the battery and a mass of fusible material such as a paraffin therein. The housing is formed in two parts, the battery connected to appropriate conductors which sealingly pass through one of those parts, the battery and fusible material in its molten state placed in one of those parts leaving an air space, and the two parts sealingly fastened together.

CROSS REFERENCE TO RELATED APPLICATIONS

The present application represents an energy source which may be used in conjunction with the telemetry transmitter disclosed in U.S. application, Ser. No. 244,154, entitled "Telethermometer Transmitter," filed Apr. 14, 1972.

BACKGROUND OF THE INVENTION

The present invention relates to a battery and container and more particularly to such a combination which may be disposed in an environment having a temperature outside the range of the battery temperature limitations for a predetermined length of time without damaging the battery. It is often necessary or desirable to monitor the temperature of a process occurring at temperatures outside of those which a battery such as a nickel-cadmium rechargeable battery can safely withstand, and prior art insulating techniques have not provided a satisfactory answer for an energy source for such a telethermometer.

It is accordingly one object of the present invention to provide an energy source for a telethermometer transmitter to be employed in monitoring temperatures outside of the energy source temperature limits.

It is another object of the present invention to maintain the temperature of a battery within prescribed limits in spite of the fact that the battery is temporarily placed in an environment having a temperature outside of those prescribed limits.

It is a further object of the present invention to provide a process for protecting a rechargeable battery while placing that battery in an elevated temperature environment for a prescribed length of time.

Another object of the present invention is to provide a scheme for protecting an electrical device from deleterious effects of environmental temperatures outside the normal operating limits of the device.

SUMMARY OF THE INVENTION

The foregoing as well as other objects and advantages of the present invention are achieved by providing an insulated hollow container open at one end and placing the battery therein. The battery is then surrounded with a molten paraffin leaving a small air space at the top and the open end closed with further insulating material. The paraffin is then solidified by lowering the temperature of the battery package.

It is a still further object of the present invention to provide a method of assembling a temperature protected battery package.

It is yet another object of the present invention to protect an electrical device from excessive temperatures by placing that device in an insulated liquid-tight housing and immersing that device in a fusible material whereby the latent heat of fusion of the material helps to prevent the device from becoming overheated.

Of course, any structure disposed in an environment of a given temperature will also achieve that temperature eventually. Thus the present invention provides a system for allowing an electrical device to be placed in an elevated temperature environment for some determinable maximum time interval after which the package must be removed and cooled before it can again enter the elevated temperature environment. In other words, the package of the present invention must be periodically cooled or recycled before it is again capable of protecting the electrical device.

The temperature extreme to which an electrical device may be submitted might also be an extremely cold environment where the temperature was below the minimum allowable operating temperature for the device. In this situation the device would be surrounded by a liquid having a high latent heat of fusion which was a liquid at normal room temperatures and which served to delay the temperature drop of the electrical device when placed in the extremely cold environment according to the heat absorbed by the surrounding material during solidification.

Normal room temperature has arbitrarily been selected as a convenient reference relative to the extreme environment temperature to which the electrical device was to be exposed and through which the package should be periodically cycled before again being exposed to the extreme temperature. As a logical extension of the foregoing concepts, an electrical device placed in, for example, an earth orbiting satellite might be exposed to temperatures above its operating maximum during half of the satellite's orbit while that satellite was exposed to sunlight and then be exposed to cold temperatures below the minimum operating temperature for the electrical device during the other portion of the orbit when the sunlight was blocked off by the earth. This situation is a cyclical temperature situation to which the present invention is well suited. The electrical device may be placed in a container and surrounded by a material having a preferably high latent heat of fusion and having a melting point between the two environmental temperature extremes. When the satellite passed from behind the earth and was exposed to the warming rays of the sun, its temperature increase would be substantially slowed by the melting of the surrounding material, and the quantity of material appropriately selected so that nearly all of the material was melted at about the same time that the satellite again passed into the earth's shade at which time the cooling of the electrical device would again be slowed by the solidifying process of the material.

Accordingly, it is yet another object of the present invention to provide a package for protecting an electrical device which is to be exposed to somewhat cyclical temperature variations wherein the temperature of the environment is outside of the temperature limitations of the electrical device for a portion of the cycle.

The foregoing as well as other objects and advantages of the present invention will be more clearly understood from the following detailed disclosure read in conjunction with the accompanying drawings.

BRIEF DESCRIPTION OF THE DRAWING

FIG. 1 is an exploded perspective view of a cylindrically shaped embodiment of the present invention;

FIG. 2 is a similar exploded perspective view showing a rectangular configuration of the insulated housing;

FIG. 3 is a temperature vs. time graph illustrating the behavior of the present invention when employed in its preferred environment.

DESCRIPTION OF THE PREFERRED EMBODIMENT

Figure 4:
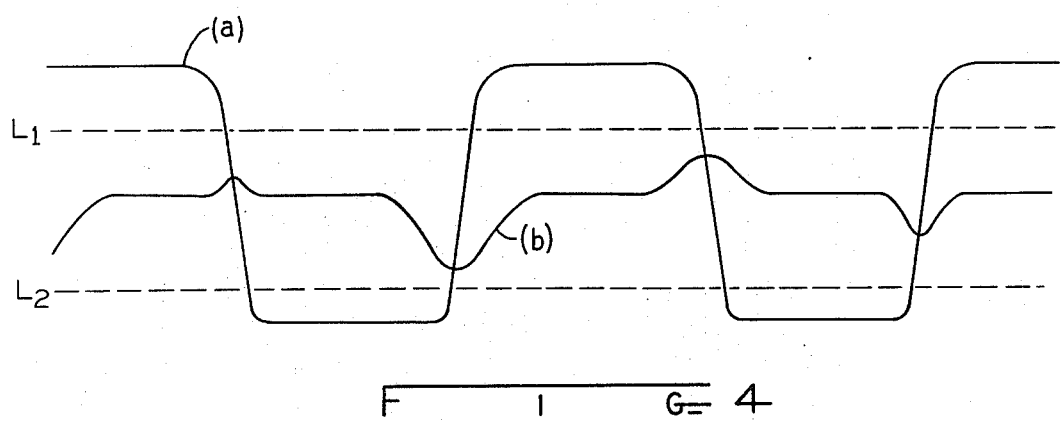
FIG. 4 is a temperature vs. time graph illustrating the principles of the present invention under cyclic environment temperature conditions.

Considering first FIG. 1, a hollow cylindrical housing 11 of heat insulating material is filled to a preferred depth with a molten hydrocarbon compound such as a paraffin which is a solid at room temperature and melts at a temperature below that which would be detrimental to a battery 13.

A paraffin is any of several members of the methane series of hydrocarbons having about 20 to 30 carbon atoms per molecule and boiling in the range of 572° Fahrenheit (300° centigrade) and above. In one preferred embodiment Gulf Oil Company's type C 211 H-Y-AL having a melting point of approximately 129° Fahrenheit was employed, however, other paraffins may be employed and will have different melting points depending upon among other things the number of carbon atoms per molecule.

As illustrated, the battery 13 is made up of ten individual nickel-cadmium cells connected in series and having the positive and negative electrodes of the battery coupled by way of conducting wires 15 and 17 to a pair of connectors 19 and 21 which are molded into the end closing slab 23 which is a molded foam material having good heat insulating qualities.

The slab 23, which may be of the same material as the housing 11 and may be, for example, Styrofoam or Nopcofoam H-402-N, is sealingly adhered to the housing 11 to thus form a liquid-tight enclosure. To effect this closing an adhesive material 25 such as an epoxy resin, for example, Eccobond 285 and catalyst No. 9 is placed in a bead around the upper open end of the housing, the battery is lowered into the still molten paraffin and the slab 23 firmly placed against the upper edge of the housing until the epoxy cures and the paraffin solidifies.

A specific device built in accordance with FIG. 1 employed a 4 inch diameter cylinder about 6.6 inches in length and containing almost 20 cubic inches of paraffin.

Turning now to FIG. 2 which shows a molten mass of fusible material 27 which may be a paraffin, for example, of the type marketed under the trademark Gulfwax, has been poured into the hollow molded foam container 29 to a preferred depth. A bead of an adhesive material 31 has been placed around the open end of the housing 29. A slab of end closing insulating material 33 has a pair of connectors 35 and 37 molded therein and exposed to receive a corresponding pair of connectors from, for example, a telethermometer transmitter as taught in the aforementioned copending application. The connectors 35 and 37 have a corresponding pair of wires 39 and 41 which couple the connectors to the positive and negative electrodes of a battery 43. The battery 43 again comprises ten cells, for example, Gould National 4Q2475 nickel-cadmium rechargeable cells. When the battery is lowered into the housing the level of the molten material raises but still leaves a small air space within the housing when the slab 33 is pressed in place against the adhesive material 31. This small void allows the fusible material room for expansion when its temperature is raised.

In a preferred rectangular embodiment the foam material had side walls between ¾ of an inch and 1 inch thick and had inside dimensions 2 inches deep, 6 inches long and 3½ inches wide. Under these circumstances the volume of the container identified as $V_1$ is about 42 cubic inches while that of the specific battery employed and identified as $V_2$ is only 3.76 cubic inches. A 4.4 cubic inch air space identified as $V$ was allowed within the container, and the remaining approximately 34 cubic inches identified as $V_3$ was occupied by the paraffin. Thus for the temperatures and times to be discussed subsequently the volume of paraffin for this configuration was almost 10 times or one order of magnitude greater than the volume of the battery, and the volume of insulating material forming the housing was substantially greater than the volume of paraffin employed. The volume of air space and that occupied by the battery were of the same order of magnitude.

The preferred environment for the telethermometer transmitter of the aforementioned copending application is a food processing oven having a nominal temperature of about 220° Fahrenheit, and the rechargeable nickel-cadmium battery to be employed is substantially damaged at such a temperature. As the temperature of the battery is increased its life (number of times it can be recharged) diminishes. For the specific nickel-cadmium battery employed it was experimentally decided that 180° Fahrenheit was a good maximum temperature to insure reasonable battery life and reasonable battery package size. These temperatures of interest are illustrated on the ordinate of the graph of FIG. 3 where $T_1$ identifies the elevated temperature of the battery package environment, $T_2$ identifies a maximum allowable operating temperature for the battery, $T_3$ indicates an exemplary temperature at which the fusible material is liquid and yet the battery is not adversely effected, and $T_4$ indicates a temperature above room temperature at which the fusible material is in its solid phase. The particular fusible material employed in the preferred embodiment had a melting point of approximately 129° Fahrenheit as illustrated by the straight horizontal dotted line in FIG. 3.

The abscissa of the FIG. 3 graph indicates time in hours elapsed since the battery package was placed in the environment of temperature $T_1$. The solid line of this graph illustrates the theoretical temperature vs. elapsed time for the battery in the cylindrical configuration of FIG. 1 under these circumstances, and specifically the temperature will rise from room temperature of, for example, 75° to the 129° melting point of the paraffin in about 3¼ hours after which the temperature remains constant for about 2 hours until all of the paraffin is melted. During melting the curve is flat in spite of the continuous transfer of heat to the battery package. The heat energy supplied per unit mass during this isothermal melting process is called the heat of fusion of the material. The temperature then again begins to rise in a somewhat exponential fashion reaching $T_2$ after about 8 hours have elapsed. The dotted curve of FIG. 3 illustrates actual experimental results with the flat portion of the curve which occurs during melting being only approximately present since the semimolten mass does not adequately circulate to maintain the exact melting temperature throughout the melting process.

The precise temperature excursions of the battery which are illustrated in an exemplary form in FIG. 3 may, of course, be substantially varied by varying the parameters associated with the corresponding configuration of FIG. 1. Lowering the thermal conductivity of the housing will increase the elapsed time, as depicted on the ordinate of FIG. 3 during which the battery may remain in the elevated environmental temperature without damage. Also selecting a fusible material with the same melting point and a greater heat of fusion or a higher specific heat will increase this elapsed time. Reducing the external area such, for example, by changing from the configuration of FIG. 2 to that of FIG. 1 or from that of FIG. 1 to a spherical configuration will also allow a reduction in the amount of fusible material within the housing while still allowing the same elapsed time.

As noted earlier, the present invention to be effective in protecting the electrical device involved must eventually be recycled to return the surrounding material to its solid phase for elevated temperature environments and to its liquid phase for extremely low temperature situations and is thus aptly suited to a situation where the system in which the device is to be employed itself experiences somewhat cyclical temperature variations. As a further example of the principles of the present invention, the temperature vs. time curves of FIG. 4 which might, for example, illustrate the satellite example mentioned earlier should be considered. The waveforms of FIG. 4 after any transient response has died out are periodic waveforms because the example to be discussed assumes temperature excursions which are outside the electrical device operating limits at both extremes. Obviously the situation need not be truly periodic in the mathematical sense particularly if only one of the extreme temperatures exceeds the electrical device limitations. For the satellite or periodic type situation waveform (a) of FIG. 4 begins with the environment temperature above some operating maximum $L_1$ and at a relatively constant level. When, for example, the satellite passes into the earth's shadow the satellite itself experiences an abrupt drop in temperature to a rather cold temperature below the minimum operating temperature of the device $L_2$. When passing into the sunshine again the temperature increases rather abruptly to its previous high level, and the process repeats itself.

If the battery package of the present invention is introduced into this cyclical ambient temperature situation at, for example, a temperature slightly less than that which it will attain under steady state conditions at later analogous points in the cycle, the temperature of the battery package will vary as illustrated in waveform (b). The first positive going peak of this waveform is less than the second and subsequent positive going peaks, and the first negative going peak exceeds in magnitude the second and subsequent similar negative going peaks because of the assumed lower than normal battery package temperature at the point where the battery package was introduced to the system. As depicted, this transient phenomena has died out by the second complete cycle of the system. As illustrated in FIG. 4 the ambient temperature variations of waveform (a) are sometimes beyond the operating temperature limitations of the devices as illustrated by the horizontal dotted lines $L_1$ and $L_2$, and the melting point of the material is both within the temperature limitations and within the ambient temperature variations. This will be true even if the ambient temperature limitations were not outside the device operating temperature limitations during both halves of the cycle.

It will be appreciated by one skilled in the art that other configurations of the protective package may be used as well as other quantities and types of insulating and fusible materials in order to arrive at the desired operating temperatures and periods of time over which the temperature is controlled. The outer insulation may in some applications be completely omitted or may take the form of a dead air or vacuum space.

While the present invention has been described with respect to a preferred embodiment, numerous modifications will suggest themselves to those of ordinary skill in the art. Thus, for example, other configurations for the insulating material enclosure such, for example, as that illustrated in FIG. 1 of the aforementioned copending application, are possible. The entire structure may also be enclosed in a protective case if so desired. Similarly, while the specific paraffin employed was a common household wax marketed by the Gulf Oil Company under the trademark Gulfwax and number C 211 H-Y-AL numerous other materials including paraffins having melting points above room temperature and below the temperature at which the battery is damaged could be employed. These and other modifications will readily suggest themselves to those of ordinary skill in the art, and accordingly the scope of the present invention is to be measured only by that of the appended claims.

What is claimed is:

1. A battery package to be employed in a telethermometer transmitter in an environment having an elevated variable temperature $T_1$ as the primary energy source therefor and comprising:
   a housing provided with a liquid-tight interior of volume $V_1$;
   a battery of volume $V_2$ within the housing interior and having a maximum allowable operating temperature $T_2$ where $T_2$ is less than $T_1$; and
   a mass of fusible material of volume $V_3$ within the housing interior, where $V_3$ is less than $V_1-V_2$, which is a solid at room temperature and melts at a temperature $T_3$ where $T_3$ is less than $T_2$.

2. The battery package of claim 1 wherein the housing comprises a hollow container of a foam material open at one end; an end closing slab of a foam material; and means sealing said slab to said container open end to thereby provide a liquid-tight enclosure.

3. The battery package of claim 2 wherein the housing is a molded heat insulating material.

4. The battery package of claim 2 further comprising a pair of connectors in the slab and exposed on one side of the slab to receive a corresponding pair of connectors from the telethermometer transmitter, said connectors being provided with a pair of wires extending from the other side of the slab and connected to the positive and negative electrodes of the battery.

5. The battery package of claim 4 wherein the battery is a plural cell rechargeable battery.

6. The battery packing of claim 1 wherein the battery is a plural cell rechargeable battery.

7. The battery package of claim 1 wherein the fusible material is a paraffin.

8. The process of protecting a rechargeable battery to be placed in an environment of elevated temperature $T_1$, said battery having a maximum allowable operating temperature $T_2$ where $T_2$ is less than $T_1$ and comprising the steps of:
   providing a hollow insulated container which is open at one end;
   placing the rechargeable battery in the container;
   surrounding the battery with a liquid at temperature $T_3$ where $T_3$ is less than $T_2$;
   closing the open end of the container with an insulating material by passing a pair of conductors through a piece of insulating material, attaching the conductors one each to the positive and negative electrodes of the battery, and adhering the end closing insulating material to the container open end to thereby provide a liquid tight container; and
   solidifying the liquid by lowering its temperature to a temperature $T_4$ where $T_4$ is less than $T_3$ and greater than room temperature.

9. The process of claim 8 wherein the step of passing comprises molding the end closing insulating material about a pair of conductive connectors each of which has attached thereto a conductive wire for connection to said battery electrodes.

10. The process of protecting an electrical device to be placed in an environment of elevated temperature $T_1$, said device having a maximum allowable operating temperature $T_2$ where $T_2$ is less than $T_1$ and comprising the steps of:
   providing a hollow container which is open at one end;
   placing the device in the container;
   surrounding the device with a liquid at temperature $T_3$ where $T_3$ is less than $T_2$;
   closing the open end of the container;

solidifying the liquid by lowering its temperature to a temperature $T_4$ where $T_4$ is greater than room temperature and less than $T_3$;

subjecting the housing containing the device and surrounding solid to a temperature $T_1$; and subsequently, after the surrounding material has liquified, removing the housing containing the device and surrounding liquid from the environment of elevated temperature $T_1$ and subjecting the housing containing the device and surrounding liquid to a temperature less than $T_3$ for a time interval sufficient to resolidify the surrounding material.

11. The process of protecting a rechargeable battery of volume $V_2$ to be placed in an environment of elevated temperature $T_1$, the battery having a maximum allowable operating temperature $T_2$ where $T_2$ is less than $T_1$ and comprising the steps of:

providing a hollow container of volume $V_1$ which is open at one end;

placing the rechargeable battery in the container;

surrounding the device with a liquid at temperature $T_3$ where $T_3$ is less than $T_2$ by providing a hydrocarbon compound which is a solid at room temperatures, melting the hydrocarbon compound to transform it into a liquid phase, and pouring a volume $V_3$ where $V_3$ is less than $V_1-V_2$, of the liquid phase hydrocarbon compound into the container;

closing the open end of the container; and solidifying the liquid by lowering its temperature to a temperature $T_4$ where $T_4$ is less than $T_3$ and greater than room temperature.

12. The process of claim 11 wherein the hydrocarbon compound is a paraffin.

References Cited

UNITED STATES PATENTS

| | | | |
|---|---|---|---|
| 2,666,091 | 1/1954 | Martin et al. | 136—161 |
| 3,100,633 | 11/1963 | Bachmann | 136—161 |

ANTHONY SKAPARS, Primary Examiner

U.S. Cl. X.R.

136—176